(12) United States Patent
Naef et al.

(10) Patent No.: US 6,762,163 B2
(45) Date of Patent: Jul. 13, 2004

(54) 2,4,7-DECATRIENAL AS PERFUMING OR FLAVORING INGREDIENT

(75) Inventors: Regula Naef, Carouge (CH); Anthony Meyer, Confignon (CH); Ferdinand Triolo, Jackson, NJ (US)

(73) Assignee: Firmenich SA, Geneva (CH)

( * ) Notice: Subject to any disclaimer, the term of this patent is extended or adjusted under 35 U.S.C. 154(b) by 0 days.

(21) Appl. No.: 10/194,706

(22) Filed: Jul. 12, 2002

(65) Prior Publication Data

US 2002/0193282 A1 Dec. 19, 2002

Related U.S. Application Data

(63) Continuation of application No. PCT/IB00/01936, filed on Dec. 20, 2000.

(30) Foreign Application Priority Data

Feb. 8, 2000 (CH) .............................................. 0248/00

(51) Int. Cl.$^7$ ................................................ A61K 7/46
(52) U.S. Cl. .......................................... 512/26; 512/25
(58) Field of Search ...................... 512/25, 26

(56) References Cited

U.S. PATENT DOCUMENTS 3,920,752 A * 11/1975 Lamparsky ................. 568/448

OTHER PUBLICATIONS

R. G. Buttery, "Characterization of Nonbasic Steam Volatile Components of Potato Chips", J. Agr. Food Chem., vol. 20, No. 3, pp. 698–700 (1972).

P.J. Ke et al., "Autoxidation of Polyunsaturated Fatty Compounds in Mackerel Oil: Formation of 2,4,7–Decatrienals", Journal of American Oil Chemists Society, vol. 52, pp. 349–353 (1975).

P.D. Harkes, "Identification of Some Previously Unknown Aldehydes in Cooked Chicken", Unilever Research, pp.356–359 (1974).

Abstract for Siefert et al., "A Convenient Synthesis of (E,E,Z)–2,4,7–decatrienal" J. Agr. Food Chem., (1980).

Roland Tressl et al., "Formation of Flavor Compenents in Asparagus, 2, Formation of Flavor Components in Cooked Asparagus", Symposium on Methods For Isolation of Trace Volatile Constituents, J. Agr. Food Chem., vol. 25, No. 3, pp. 459–463 (1977).

P.W. Meijboom et al., "2–trans, 4–cis–Decatrienal, the Fishy Off–Flavor Occuring in Strongly Autoxidized Oils Containing Linolenic Acid or ω 3,6,9, etc., Fatty Acids", Journal of American Oil Chemists Society, vol. 4, pp. 555–558 (1972).

* cited by examiner

*Primary Examiner*—Jill Warden
*Assistant Examiner*—Monique T. Cole
(74) *Attorney, Agent, or Firm*—Winston & Strawn LLP

(57) ABSTRACT

Compounds of formula

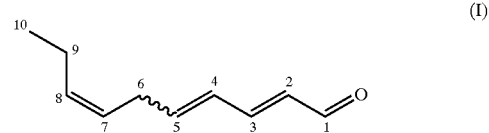

(I)

wherein the double bond in position 4 has a cis or trans configuration, or a mixture of these compounds, are useful as perfuming or flavoring ingredients, in particular as a booster for mandarin or tangerine type flavors.

19 Claims, No Drawings

2,4,7-DECATRIENAL AS PERFUMING OR FLAVORING INGREDIENT

CROSS-REFERENCE TO RELATED APPLICATIONS

This application is a continuation of the U.S. national phase designation of International Application PCT/IB00/01936 filed Dec. 20, 2000, the entire content of which is expressly incorporated herein by reference thereto.

TECHNICAL FIELD

The present invention relates to the flavor and fragrance industry. It concerns more particularly the use, as a perfuming or flavoring ingredient, of a compound of formula

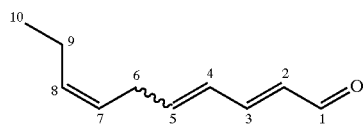

wherein the double bond in position 4 has a cis or trans configuration, or of a mixture of these compounds.

BACKGROUND ART

The compound of formula (I) is known from the prior art. Several authors have in fact identified 2,4,7-decatrienal formed in natural compounds during the oxidative degradation of unsaturated fatty acids. For example, R. Tressl et al. in J. Agric. Food Chem., 1977, Vol. 25, p. 459, have identified 2,4,7-decatrienal among the constituents of cooked asparagus, with the compound being formed following the degradation of fatty acids. Previously, other authors had also identified this compound as a product derived from the degradation of linolenic acid, in cooked chicken (Harkes et al., J. Am. Oil Chem. Soc., 1974, Vol. 51, p. 356), as well as in mackerel oil (Ke et al., J. Am. Oil Chem. Soc., 1975, Vol. 52, p. 349) or in French fries (Buttery et Ling, J. Agric. Food Chem., 1972, Vol. 20, p. 698). Following these identifications, 2,4,7-decatrienal was synthesised. In particular, J. Am. Oil Chem. Soc., 1972, Vol. 49, p. 555 discloses the synthesis of (2E,4E,7Z)-, respectively (2E,4Z,7Z)-2,4,7-decatrienal. Moreover, the latter document describes the characteristic odor of each one of its isomers. In particular, the odors of the latter have been described as being fishy, with the authors further concluding that 2,4,7-decatrienal was responsible for the typical fishy smell associated with oxidized linolenic acid. These fishy odors characterising the aldehyde are described as off-notes, that is to say as unpleasant, undesirable or even repulsive notes.

SUMMARY OF THE INVENTION

The present invention relates to a process to confer, improve, enhance or modify the mandarin or tangerine character of a composition or product, wherein a perceptible amount of the compound of formula (I)

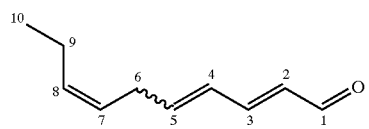

wherein the double bond in position 4 has a cis or trans configuration, or of a mixture of these compounds, is added to the composition or product.

It has now unexpectedly been found that 2,4,7-decatrienal, in the form of one of its isomers of the (2E,4Z,7Z) or (2E,4E,7Z) configuration, or in the form of a mixture of these isomers, could be advantageously used in the flavoring of usually flavored compositions or consumer products. This is particularly surprising given that, as mentioned above, this compound was until now known as a degradation product of a natural product, responsible for undesirable and repulsive off-notes.

The inventors have now been able to establish that, contrary to all expectations, this compound possesses very interesting flavoring properties, and that it develops, in particular in some specific compositions, gustatory notes which are particularly useful for the reconstitution of flavors of the mandarin or tangerine type, to which it confers a very natural character.

The present invention also relates to the use as a perfuming or flavoring ingredient of a compound of formula

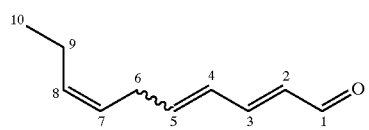

wherein the double bond in position 4 has a cis or trans configuration, or of a mixture of these compounds.

The compounds of the invention develop a fishy aromatic top note, more or less fatty and oily, depending on the specific compound selected.

Among the compounds of formula (I), (2E,4Z,7Z)-2,4,7-decatrienal is particularly appreciated. In fact, this isomer possesses a very powerful flavor and develops, besides the fishy note, a linseed oil type note, which can be advantageously used in applications in compositions as shown below. Moreover, the mixtures of (2E,4Z,7Z)-2,4,7-decatrienal together with (2E,4E,7Z)-2,4,7-decatrienal, containing a preponderant amount of (2E,4Z,7Z)-2,4,7-decatrienal, are also very much appreciated according to the invention. In particular, the mixtures comprising at least 75% of (2E,4Z,7Z)-2,4,7-decatrienal, are preferred. These mixtures develop a multi-varied aromatic note, wherein the fishy and oily characters are represented, but together with green, fruity, woody, melon, linseed oil, olive oil, cucumber or kiwi notes.

Besides their very interesting flavor, the compounds of the invention also provide a fatty and round mouthfeel, which may be advantageously used for the flavoring of a large number of products.

DETAILED DESCRIPTION OF THE PREFERRED EMBODIMENTS

In a general manner, the use of the compounds of formula (I) proves to be advantageous in all flavoring compositions of the citrus type. More particularly, their use is very well appreciated in flavoring compositions of the mandarin or tangerine type, wherein they can be used as boosters or reinforcing agents for this type of flavor. In fact, thanks to the presence of their oily and fishy notes, the compounds of the invention, distinctively characterize these mandarin/tangerine type flavors with respect to namely orange type flavors. Moreover, the variety of the other notes presented by these compounds, such as citrus, melon, green or kiwi notes, confers to the compositions to which they are added a very natural taste as well as a reinforcement of their pulpy and juicy character. Finally, they confer to these compositions a mouthfeel which renders the flavor complete.

According to one embodiment of the invention, a compound of formula (I) may be admixed with (Z)-4-dodecenal before being added to a flavoring composition, preferably one of the mandarin or tangerine type. In fact, the association of both compounds intensifies the juicy, green and citrus character of such a composition, while preserving its oily and fatty character, making it thus possible to obtain a very natural flavoring composition. Typical amounts of (Z)-4-dodecenal in such compositions can vary from 0.05 to 0.4% by weight relative to the weight of the composition.

It goes without saying that the compounds of the invention can also be advantageously used in other types of flavoring or flavored compositions. One can cite as example their positive effect when added to compositions of the fruity type, and namely of the tropical fruit type, which are rendered more juicy, natural and fresh, and the fruity character of which is reinforced.

In a general manner, the oily, fishy character of the compounds of the invention can be advantageously used in applications such as beverages, in particular teas, and in oily, green, fruity and tropical type flavors.

The value of the compounds of the invention as flavoring ingredients is all the more important in that, although their aromatic top note is very powerful, a large number of sub-notes also present provides an unexpected positive effect in the compositions to which they are added.

The concentrations in which the compounds of formula (I) can be added to the flavoring compositions and to the products that have to be flavored in order to impart the cited effects vary in a large range of values, which may range from 0.01 ppm to 0.5 ppm or even to 1 ppm, with respect to the weight of the final product in which they are incorporated. These concentrations notably depend on the nature of the isomer or of the mixture used. For instance, as (2E,4Z,7Z)-2,4,7-decatrienal is more powerful than its isomer, or even than a mixture of isomers, it will generally be used in lower concentrations than those cited.

The compounds of the invention can be useful for the flavoring of varied consumer products such as foods, beverages, chewing-gums, toothpastes or pharmaceutical preparations.

Examples of foods or beverages susceptible of being flavored include ice creams, dessert creams, yogurts, dairy products in general, confectionery products, syrups, teas, cooked sugars, or marmalades.

The compounds of the invention are incorporated in foods, beverages, chewing-gums or pharmaceutical preparations to be flavored, according to usual processes in the art, either alone, or in admixture with other natural or synthetic flavoring ingredients, such as for instance (Z)-4-dodecenal mentioned above. They can be used as such or in solution in usual edible solvents such as triacetin, ethylic alcohol or propylene glycol, or in admixture on a solid support, for example a dextrin or gum arabic.

Moreover, it has been noticed that the compounds of the invention are also useful in the field of perfumery. They possess an odor, the linseed oil note of which is more perceptible than the aldehyde connotation. Furthermore, they present a very natural mandarin note.

The compounds of the invention can be advantageously used in fine perfumery, as well as in functional applications, for the preparation of perfuming compositions and perfumed products. Among the latter, one can cite perfumes and Colognes, soaps, shower or bath gels, shampoos and other hair-care products, cosmetic preparations and body deodorants or air fresheners. They can also be useful in the perfuming of detergents for textiles and dishes, fabric softeners and household products.

When they are used for these applications, interesting olfactory effects can be obtained using low concentrations, and the skilled person in the art is able to choose the compounds as a function of the nature of the product that has to be perfumed and of the perfume intensity desired.

Their odor proves to be also very powerful. Therefore, they can be used in even very diluted concentrations, such as for instance about 0.01% by weight and can range up to 0.6% by weight or more, depending on the type of application.

In these applications, the compounds of the invention can be used either alone, or in admixture with perfuming co-ingredients, solvents or adjuvants of current use in the art. A more detailed citation of these co-ingredients would be superfluous here, the skilled person in the art being able to select them on the basis of his experience and with inspiration from reference texts such as the S. Arctander's book, Perfume and Flavor Chemicals, Montclair, N.J. (1969) or more recent versions thereof.

EXAMPLES

The invention will now be described in a more detailed manner, in the following examples, wherein the abbreviations have the usual meaning in the art.

Example 1

Preparation of the Compounds of Formula (I)

The processes for the preparation of (2E,4Z,7Z)-, respectively (2E,4E,7Z)-decatrienal, are described by P. Meijboom et al. in J. Am. Oil Chem. Soc., 1972, Vol. 49, p. 555. The content of this document is expressly incorporated herein by reference thereto.

The compounds used according to the present invention presented the following analytical characteristics:

a) (2E,4Z,7Z)-2,4,7-decatrienal

MS: 150(3, $M^+$.), 135(3), 132(2), 121(26), 117(10), 107 (15), 103(17), 91(65), 79(100), 67(42), 63(14), 53(37), 39(80), 27(41).

$^1$H-NMR: 1.00(t, J=8, 3H, C10); 2.10(m, 2H, C9); 3.08 (dxd, $J_1$=8, $J_2$=8, 2H, C6); 5.35(m, 1H, C7); 5.52(m, 1H, C8); 5.95(dxt, $J_1$=10, $J_2$=8, 1H, C5); 6.15(dxd, $J_1$=16, $J_2$=8, 1H, C2); 6.30(dxd, $J_1$=10, $J_2$=10, 1H, C4); 7.48(dxd, $J_1$=16, $J_2$=10, 1H, C3); 9.62(d, J=8, 1H, C1).

$^{13}$C-NMR: 193.8(d); 146.4(d); 141.5(d); 133.7(d); 132.1 (d); 126.6(d); 124.8(d); 26.6(t); 20.7(t); 14.1(q).

b) (2E,4E,7Z)-2,4,7-decatrienal

MS: 150(6, $M^+$.), 135(3), 132(2), 121(30), 117(9), 107 (16), 103(19), 91(66), 79(100), 67(47), 63(17), 53(42), 39(81), 27(42).

$^1$H-NMR: 0.97(t, J=8, 3H, C10); 2.08(m, 2H, C9); 2.97 (dxd, $J_1$=8, $J_2$=8, 2H, C6); 5.35(m, 1H, C7); 5.52(m, 1H, C8); 6.08(dxd, $J_1$=16, $J_2$=8, 1H, C2); 6.30(m, 2H, C4 and C5); 7.10(dxd, $J_1$=16, $J_2$=10, 1H, C3); 9.53(d, J=8, 1H, C1).

$^{13}$C-NMR: 193.8(d); 152.6(d); 144.9(d); 134.2(d); 130.3 (d); 128.6(d); 124.0(d); 30.8(t); 20.6(t); 14.1(q).

Example 2
Flavoring Composition of the Tangerine Type 0.5 ppm of (2E,7Z)-2,4,7-decatrienal (4Z:4E, 75:25) were added to a basic solution of 100 ppm of a tangerine type flavor (N° 727730.01 A; origin: Firmenich SA, Geneva, Switzerland) in acidulous sweetened water (7% sucrose, 0.15% citric acid). The thus obtained flavored composition and the basic solution were compared on a blind test by a panel of expert flavorists. The latter preferred the composition flavored according to the present invention and mentioned in particular that its taste was more complete, more natural and closer to tangerine than to orange.

Example 3
Tea Type Flavoring Composition 0.2 pm of (2E,7Z)-2,4,7-decatrienal (4Z:4E, 75:25) were added to a basic solution of a tea flavor (N° 597.302 T; origin: Firmenich SA, Geneva, Switzerland) (1000 ppm) in acidulous sweetened water (7% sucrose, 0.15% citric acid). The thus obtained flavored composition and the basic composition were compared on a blind test by a panel of expert flavorists. The latter preferred the composition flavored according to the present invention, and indicated in particular that it possessed a fresher infused flavor, and that its taste was more complete and more seasoned than that of the basic solution. Moreover, from a mouthfeel point of view, the panel of experts noticed that the composition of the invention was more naturally astringent than the solution lacking in (2E,7Z)-2,4,7-decatrienal.

Example 4
Kiwi Type Flavoring Composition 0.2 ppm of (2E,7Z)-2,4,7-decatrienal (4Z:4E, 75:25) were added to a basic solution of a kiwi flavor (N° 597.944 T; origin: Firmenich SA, Geneva, Switzerland) (1000 ppm) in acidulous sweetened water (7% sucrose, 0.15% citric acid). The thus obtained flavored composition and the basic solution were compared on a blind test by a panel of expert flavorists. The latter preferred the composition flavored according to the present invention and mentioned in particular that it provided a more complete mouthfeel, and that its taste was more juicy and more tropical.

Example 5
Mandarin Type Flavoring Composition

A basic flavoring composition of the mandarin type was prepared with the following ingredients:

| Ingredients | Parts by weight |
| --- | --- |
| Methyl methylanthranilate | 20 |
| Orange essential oil | 980 |
| Total | 1000 |

To this basic composition, 0.4 parts by weight of (Z)-4-dodecenal were added to obtain a first composition referred to as composition A; 0.4 parts by weight of (2E,4Z,7Z)-2,4,7-decatrienal were added to obtain a second composition referred to as composition B; and finally 0.2 parts by weight of (Z)-4-dodecenal and 0.3 parts by weight of (2E,4Z,7Z)-2,4,7-decatrienal to obtained a third composition referred to as composition C. These three compositions A, B and C were then evaluated on a blind test, by some expert flavorists. The latter described composition A as having a zest type character, aldehydic, together with a fishy note typical of mandarin; composition B as strongly reminding tangerine taste, and composition C, which was very prized by the flavorists, was found to mix in a very pleasant way the fatty and aldehydic character and the oily, fishy notes of mandarin and tangerine, thus providing a natural and juicy mixture.

What is claimed is:

1. A process to impart or enhance a citrus character to a composition or product, wherein the compound of formula (I)

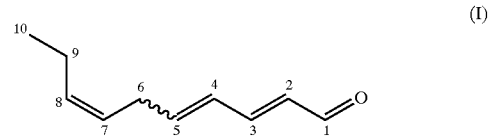

in which the double bond in position 4 has a cis or trans configuration, or a mixture of these compounds, is added to the composition or product in an amount sufficient to impart a citrus character to said composition or product or to enhance the citrus character of said composition or product.

2. Process according to claim 1, wherein the compound of formula (I) is present in combination with (Z)-4-dodecenal.

3. The method of claim 1, wherein the compound is (2E,4Z,7Z)-2,4,7-decatrienal.

4. The method of claim 1, wherein the compound is a mixture of (2E,4Z,7Z)-2,4,7-decatrienal and (2E,4E,7Z)-2,4,7-decatrienal containing a preponderant amount of (2E,4Z,7Z)-2,4,7-decatrienal.

5. The method of claim 3, wherein the amount of (2E,4Z,7Z)-2,4,7-decatrienal is at least 75%.

6. A method of preparing a perfuming composition or a perfumed product which comprises adding to the composition or product a compound of formula (I)

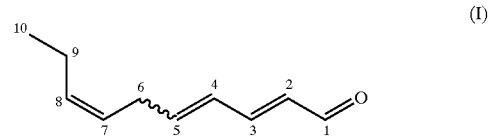

wherein the double bond in position 4 has a cis or trans configuration, or of a mixture of these compounds, in an amount sufficient to impart to the composition or product an olfactory citrus character.

7. The method of claim 6, wherein the compound is (2E,4Z,7Z)-2,4,7-decatrienal.

8. The method of claim 6, wherein the compound is a mixture of (2E,4Z,7Z)-2,4,7-decatrienal and (2E,4E,7Z)-2,4,7-decatrienal containing a preponderant amount of (2E,4Z,7Z)-2,4,7-decatrienal.

9. The method of claim 8, wherein the amount of (2E,4Z,7Z)-2,4,7-decatrienal is at least 75%.

10. A perfuming composition or perfumed product containing as active ingredient a compound of formula (I)

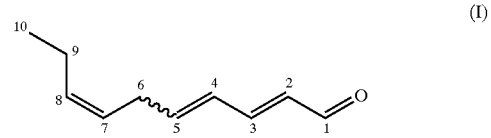

wherein the double bond in position 4 has a cis or trans configuration, or a mixture of these compounds, said compound or mixture being present in an amount sufficient to impart an olfactory citrus character to the composition or product, and being in the form of a perfume or a Cologne, a soap, a bath or shower gel, a shampoo or other hair-care product, a cosmetic preparation, a body deodorant or an air freshener, a deterrent or a fabric softener, or a household product.

11. Perfuming composition or perfumed product according to claim 10, wherein the active ingredient is present in an amount to impart a mandarin or tangerine character to the composition or product.

12. A method of preparing a flavoring composition or flavored product, which comprises adding to the composition or product a compound of formula (I)

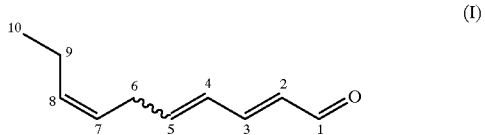
(I)

wherein the double bond in position 4 has a cis or trans configuration, or a mixture of these compounds, in an amount sufficient to impart to the composition or product a flavor having a gustatory citrus character.

13. The method of claim 12, wherein the compound is (2E,4Z,7Z)-2,4,7-decatrienal.

14. The method of claim 12, wherein the compound is a mixture of (2E,4Z,7Z)-2,4,7-decatrienal and (2E,4E,7Z)-2,4,7-decatrienal containing a preponderant amount of (2E,4Z,7Z)-2,4,7-decatrienal.

15. The method of claim 14, wherein the amount of (2E,4Z,7Z)-2,4,7-decatrienal is at least 75%.

16. A flavoring composition or flavored product containing as active ingredient a compound of formula (I)

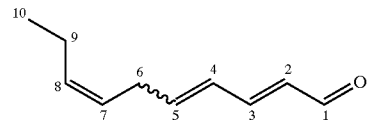
(I)

wherein the double bond in position 4 has a cis or trans configuration, or a mixture of these compounds, said compound or mixture being present in an amount sufficient to impart an olfactory citrus character to the composition or product, wherein the compound of formula (I) is present at a concentration of between 0.01 ppm and 1 ppm.

17. A flavoring composition or flavored product according to claim 16, and also containing (Z)-4-dodecenal as an active co-ingredient.

18. The process according to claim 1, wherein the compound or mixture of compounds is present in an amount that provides an odor note: (a) having a linseed oil character which is more perceptible than aldehyde connotation or (b) of a natural mandarin note.

19. A method of reconstituting a mandarin or tangerine flavor in a composition or product, which comprises adding thereto a compound of formula (I)

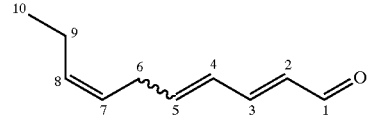
(I)

in which the double bond in position 4 has a cis or trans configuration, or of a mixture of these compounds, in order to develop a gustatory note of such flavor with the flavor having a natural character.

* * * * *

UNITED STATES PATENT AND TRADEMARK OFFICE
CERTIFICATE OF CORRECTION

PATENT NO. : 6,762,163 B2
DATED : July 13, 2004
INVENTOR(S) : Naef et al.

It is certified that error appears in the above-identified patent and that said Letters Patent is hereby corrected as shown below:

Title page,
Item [56], References Cited, U.S. PATENT DOCUMENTS, after "3,920,752" insert
-- 4,687,599    8/1987..................... 512/27 --.
OTHER PUBLICATIONS,
"P.D. Harkes", reference, delete "Unilever Research," and insert -- J. Am. Oil Chem. Soc., Vol. 51, --.
"Roland Tressel et al.", reference, after "Formation of Flavor", delete "Compenents" and insert -- Components --.
"P.W. Meijboom et al.", reference, delete "2-trans, 4-cis-Decatrienal," and insert -- 2-*trans*, 4-*cis*, 7-*cis*-Decatrienal, --.

Column 7,
Line 6, after "freshener, a" delete "deterrent" and insert -- detergent --.

Column 8,
Line 15, change "A flavoring composition" to -- The flavoring composition --.

Signed and Sealed this

Twenty-third Day of November, 2004

JON W. DUDAS
*Director of the United States Patent and Trademark Office*